US008979522B2

(12) United States Patent
Wolff

(10) Patent No.: US 8,979,522 B2
(45) Date of Patent: Mar. 17, 2015

(54) FIBER ORIENTING TECHNOLOGY FOR A GRINDING MACHINE

(75) Inventor: James B. Wolff, Portland, OR (US)

(73) Assignee: Formtec, LLC., Sheboygan, WI (US)

(*) Notice: Subject to any disclaimer, the term of this patent is extended or adjusted under 35 U.S.C. 154(b) by 0 days.

(21) Appl. No.: 13/573,369

(22) Filed: Sep. 12, 2012

(65) Prior Publication Data

US 2013/0099036 A1 Apr. 25, 2013

Related U.S. Application Data

(63) Continuation-in-part of application No. 13/374,441, filed on Dec. 29, 2011, which is a continuation-in-part of application No. 13/374,417, filed on Dec. 27, 2011, which is a continuation-in-part of application No. 13/374,422, filed on Dec. 27, 2011, which is a continuation-in-part of application No. 13/374,421, filed on Dec. 27, 2011, which is a continuation-in-part of application No. 13/374,423, filed on Dec. 27, 2011, which is a continuation of application No. 13/199,910, filed on Sep. 12, 2011.

(51) Int. Cl.

*B29C 47/00* (2006.01)
*B02C 18/30* (2006.01)
*B02C 18/36* (2006.01)
*B02C 23/08* (2006.01)

(52) U.S. Cl.

CPC ............... *B02C 18/30* (2013.01); *B02C 18/365* (2013.01); *B02C 23/08* (2013.01); *B02C 2018/308* (2013.01)
USPC ........................ 425/382 R; 425/377; 425/198

(58) Field of Classification Search

CPC ........ B02C 18/30; B02C 18/36; B02C 23/14; B02C 23/08; B02C 18/365; B02C 18/308; A22C 7/00; A22C 7/0007; A22C 7/0076; A22C 7/0084; A22C 17/00; A22C 17/0006; A22C 11/00; A47J 43/20; A23P 1/12; A23P 1/105
USPC ...................... 425/377, 382 R, 198; 426/513; 241/82.5, 41.1, 24.16
See application file for complete search history.

(56) References Cited

U.S. PATENT DOCUMENTS

| | | | | | |
|---|---|---|---|---|---|
| 3,793,466 | A * | 2/1974 | Kawkins et al. | .............. | 426/274 |
| 3,903,315 | A * | 9/1975 | Giles et al. | .................... | 426/388 |
| 4,356,595 | A * | 11/1982 | Sandberg et al. | ............ | 426/512 |
| 4,541,143 | A * | 9/1985 | Holly | ........................... | 426/513 |
| 4,608,731 | A * | 9/1986 | Holly | ........................... | 426/513 |
| 6,319,538 | B1 * | 11/2001 | Sheehy | ......................... | 426/646 |
| 6,375,997 | B1 * | 4/2002 | Sheen et al. | ................. | 426/283 |
| 7,862,330 | B2 * | 1/2011 | Hansen et al. | ................ | 425/573 |
| 2007/0090221 | A1 * | 4/2007 | Lesar et al. | .................. | 241/82.5 |
| 2008/0089971 | A1 * | 4/2008 | Sandberg et al. | ............ | 425/430 |

FOREIGN PATENT DOCUMENTS

| | | | | |
|---|---|---|---|---|
| EP | 720816 A1 * | 7/1996 | ............. | A22C 11/00 |

* cited by examiner

*Primary Examiner* — Yogendra Gupta
*Assistant Examiner* — Ninh Le
(74) *Attorney, Agent, or Firm* — Philip M. Weiss; Weiss & Weiss

(57) ABSTRACT

An apparatus and method for accelerating food product and decreasing pressure of the product in order to cause the product to be stretched aligning the fibers of the product.

8 Claims, 6 Drawing Sheets

FIBER ORIENTING TECHNOLOGY FOR A GRINDING MACHINE

RELATED APPLICATIONS

The present application is a continuation-in-part of pending application Ser. No. 13/374,441 filed Dec. 29, 2011, which is a continuation-in-part of pending application Ser. No. 13/374,417, filed Dec. 27, 2011, which is a continuation-in-part of pending application Ser. No. 13/374,422, filed Dec. 27, 2011, which is a continuation-in-part of pending application Ser. No. 13/374,421, filed Dec. 27, 2011 and which is a continuation-in-part of pending application Ser. No. 13/374,423, filed Dec. 27, 2011 which all are a continuation-in-part of application Ser. No. 13/199,910 filed on Sep. 12, 2011.

FIELD OF THE INVENTION

The present invention relates to an apparatus and method for accelerating food product and a decrease in pressure of the product in order to cause the product to be stretched, aligning the fibers of the product.

BACKGROUND OF THE INVENTION

Current forming technology relies on high pressure, speed and complicated material flow pathways which produce a product lacking in quality. High pressure works the meat cells, the higher the pressure the more massaging, squeezing and turbulence of the meat cells takes place. High speed combined with a complicated flow path increases the pressure and turbulence and works the meat product, releasing and mixing myosin/actin from the cells causing the muscle fiber to bind together and contract (protein bind). The contraction takes place during high heat application as in cooking. The action of the meat fiber is to contract in length, this contraction combined with protein bind not only shortens the muscle fiber which if not controlled causes odd cook shapes but a rubber like texture with a tough bite.

In muscle, actin is the major component of thin filaments, which together with the motor protein myosin (which forms thick filaments), are arranged into actomyosin myofibrils. These fibrils comprise the mechanism of muscle contraction. Using the hydrolysis of ATP for energy, myosin heads undergo a cycle during which they attach to thin filaments, exerting a tension, and then depending on the load, perform a power stroke that causes the thin filaments to slide past, shortening the muscle.

Muscle fibril structure is measured from micrometers to several millimeters in length. These fibril structures are bundled together to form muscles. Myofibril proteins are the largest group and probably more is known about these proteins than any other. In muscle cells actin is the scaffold on which myosin proteins generate force to support muscle contraction. Myosin is the major protein that is extracted from the muscle cells by mechanical means.

An important purpose of tumbling and massaging is to solubiliize and extract myofibril proteins to produce a protein exudate on the surface of the meat fiber. The exudates bind the formed pieces together upon heating. Binding strength also increases with increased massaging or blending time. This is due to increased exudate formation on the surface of the meat. Crude myosin extrudate is increased with increased blending time.

Grinding/chopping utilizes the concept of rupturing the cell to release protein. This mechanical chopping or shearing takes place at the shear/fill plate hole. This process extracts actin and myosin from muscle cells.

Mixing, utilizes friction and kinetic energy to release protein exudate. Fill hole shape and spacing can cause dead spots and turbulence in the meat flow. This change of direction is a form of mixing and massaging. This is another process, which extracts actin and myosin from muscle cells.

Massaging, utilizes friction, kinetic energy and pressure to increase protein exudate. This action takes place almost anywhere meat comes in contact with processing equipment and is moved or has a change of direction via pressure. This is also a procedure which involves extracting actin and myosin from muscle cells.

Meat patties are comprised of whole muscle meat, table trimmings, or LFTB (lean finely textured beef) or a combination thereof.

A grinder/mixer blends the product to either a course grind or a fine grind which creates a finished product. This creates a homogenous mix which is formed into a noodle.

With frozen foods, a flaker can be used which first flakes the frozen food and then it is ground in a grinder/mixer/blender.

SUMMARY OF THE INVENTION

It is an object of the present invention for the fiber orientation technology to reduce the release and mixing of myosin with actin. It is an object of the present invention for the fiber orientation technology to control orientation of the fiber. It is an object of the present invention for the fiber orientation technology to provide less myosin activity resulting in a better bite/bind and control over the final cook shape.

The present invention relates to an apparatus and method for accelerating food product in order to cause the product to be stretched, aligning the fibers of the product. It is an object of the present invention for a hole or orifice to change size from a larger to a smaller diameter with vertical or concave sides. It is an object of the present invention for the sides to have a sharp edge. The principle has design similarities to a venturi. It is referred to as a nozzle, venturi, orifice, or a restriction to flow which results in product acceleration with a corresponding pressure drop through the orifice.

By reducing the diameter of a tube through which a substance passes, the velocity is increased. This is the principle of Conservation of Mass. When the velocity increases the pressure of the material is reduced. This is the principle of Conservation of Energy.

For every liquid, there is a ratio between the cross-sectional area (C) and the cross-sectional area (c) through which velocity can only be increased by reducing temperature or increasing pressure. Although ground meat is not a homogeneous liquid, the same concepts still apply. It is impossible to attain a venturi effect unless there is a transition between the orifices and the small orifice has a finite length.

A venturi allows a smooth transition from a larger orifice to a smaller one. This transition minimizes flow transitions and thereby reduces restrictions in the system. The transition minimizes energy loss and supports fiber alignment.

The transition in a venturi is extremely difficult to create in a production tooling environment. As a result, using the geometric properties of a sphere or similar shape allows the ability to obtain many of the venturi effect properties using standard production practices.

All points on a sphere are the same distance from a fixed point. Contours and plane sections of spheres are circles. Spheres have the same width and girth. Spheres have maximum volume with minimum surface area. All of the above properties allow meat to flow with minimum interruptions. There are no static or dead zones. No matter what angle the cylinder intersects the sphere, the cross section is always a perfect circle.

It is an object of the present invention to increase meat velocity forcing linear fiber alignment.

It is an object of the present invention to have spherical geometry or a similar shape in grinder plate or orifice plate apertures to create venturi effects.

The present invention relates to a grinding machine which has a hopper into which the material to be ground is placed. The grinding machine further comprises a grinder portion, including a grinding head, a mounting ring, a bridge, a collection tube, an auger or feed screw, and a barrel. A feed screw is located in the grinding head to advance material in the hopper through the head. A knife assembly is mounted at the end of the feed screw and rotates with the feed screw in combination with the orifice plate or grinder plate. This grinds the material that is advanced toward the orifice plate by the feed screw. The feed screw has a bore at its downstream end into which a center pin is inserted. The center pin extends through a central passage of the knife assembly, and through a bushing that is positioned in a central opening of the orifice plate. A collection cone is located downstream of the orifice plate and is secured to the bushing. The orifice plate is comprised of an outer section having a plurality of grinding apertures and an inner section having at least one collection passage. The collection passage or passages of the orifice plate lead to a collection structure defined by the collection cone, which generally includes a collection cavity and a discharge passage. An orifice plate guard is located downstream from the orifice plate and maintains the collection structure in place. A mounting ring holds the guard against the orifice plate and mounts the intervening structures to the body of the grinding head.

The present invention relates to a grinder head for a meat grinding machine. The invention improves fiber alignment. The meat fiber is drawn through the orifices of the grinder plate which stretches the meat fiber. The venturi effect created by the orifice aligns the fiber through the blade. The meat fiber is stretched and allows a clean cut. There is little or no release of myosin.

It is an object of the present invention to get the lowest cross section through the cut of the meat.

It is an object of the present invention for the grinder to grind food product.

This product flow is accelerated by using a system which will reduce the cylinder size. Using the equation from Bernoulli's law of $A_1V_1=A_2V_2$, the velocity is increased by reducing the cross sectional area.

The typical way of accomplishing this is the use of a venturi nozzle. However, a venturi requires a gradual area reduction and a finite length throat. Given the restrictions of the plate thickness, it was not feasible to put a venturi in a grinder or orifice plate. However, utilizing the properties of a sphere, the product achieves acceleration by intersecting a cylinder with a sphere of a larger diameter.

In a sphere, pressure is equal in all directions. Therefore, when the sphere is intersected by a cylinder, the product will move in a direction coaxial with the cylinder at a high velocity. The impact on the product in the grinder plate is greater because the product moving at a higher velocity will generate more momentum.

It is an object of the present invention to provide a venturi effect in the apertures of the orifice plate by creating a sphere to cylinder apertures. This creates a venturi effect or a venturi pump. This accelerates the product through the orifice. The spherical cut creates equal pressure in all directions. It is an object of the present invention to have a spherical hemisphere or curved structure which has a diameter which is no greater than the choke flow for the liquid gas or solid used and is no less than the diameter of the connected cylindrical portion.

It is an object of the present invention for the spherical hemisphere or curved structure to have a diameter between 1.1 to 2.5 times greater than a cylindrical portion which intersects the same. It is preferred to have a sharper edge from the edge to the hole.

It is an object of the present invention to use spherical geometry, with cylindrical intersections, and the ratio of the diameter of the sphere divided by the area of the cylinder to be no greater than the choke flow for the liquid gas or solid used and is no less than the diameter of the connected cylindrical to create conditions to meat flow which maintain improved cell structure.

Irregular shapes do not have diameters, but they do have areas. For a given ratio of a linear item, the ratio becomes the square of the linear ratio. For curved and irregular shapes, the ratio of the initial area and the reduced area is from approximately 1.2 to 6.25.

It is an object of the present invention to provide a bone collector which has the fiber orientation technology. Bones get caught on the grinding head, a pathway comes out of the grinding head.

It is an object of the present invention for a bone collector pathway to have the above fiber orientation technology which comprises having a sphere into a cylinder which creates a smaller diameter which increases acceleration of the meat, taking with it the bones, and leaving more meat behind.

It is an object of the present invention for effluent to come from a steel tube which goes into a sphere or hemisphere into a cylinder with a finite length to create a venturi effect. The change of orifice size changes flow control.

It is an object of the present invention for the bone collector to be self-cleaning.

DETAILED DESCRIPTION

Figure 1:
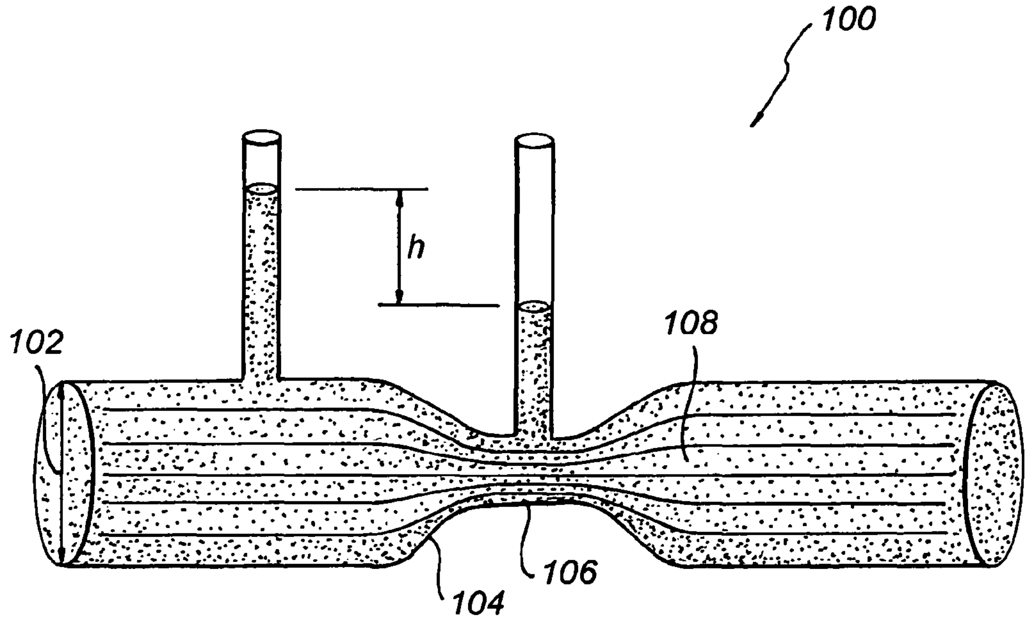
Fig. 1 (Prior Art)
FIG. 1 is an illustration of a prior art venturi design.

FIG. 1 shows a prior art venturi 100 comprising a diameter 102 angle transition 104, throat length 106 and discharge 108.

Figure 2:
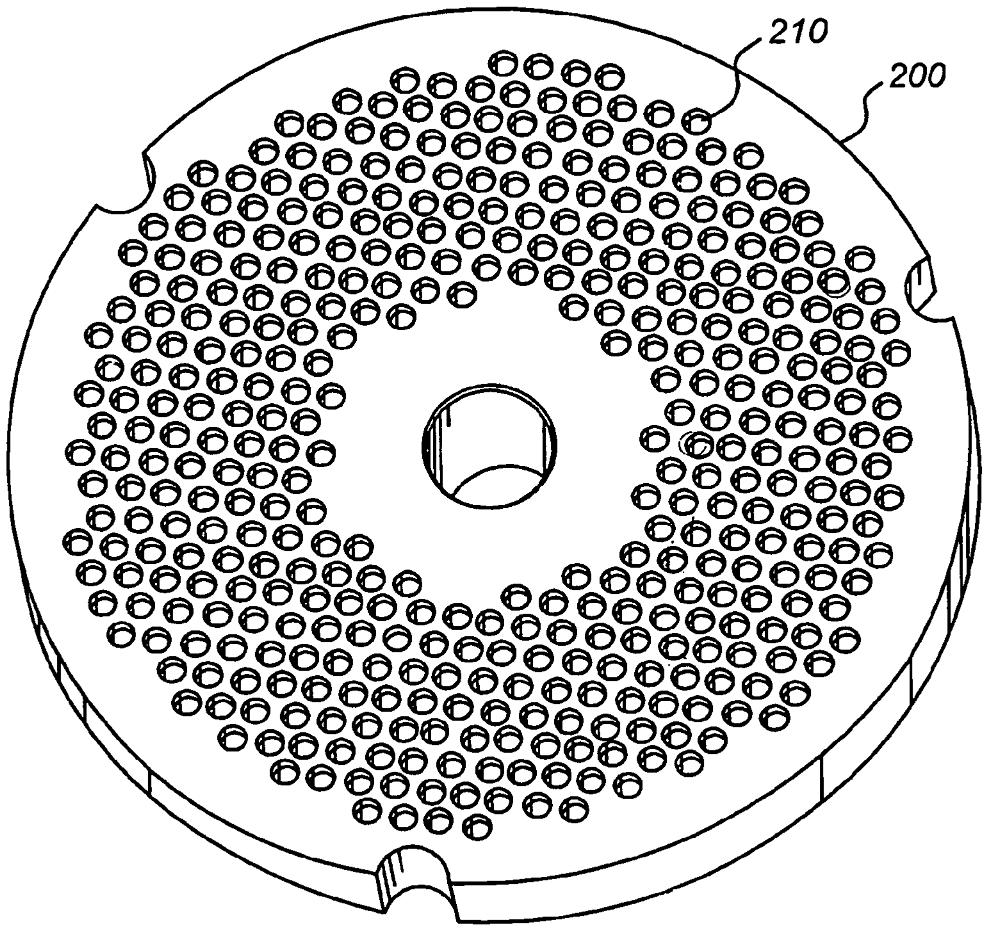
FIG. 2 is a top view of an embodiment of an orifice or grinder plate of the present invention.

FIG. 2 shows an orifice plate 200 having apertures 210.

Figure 3:
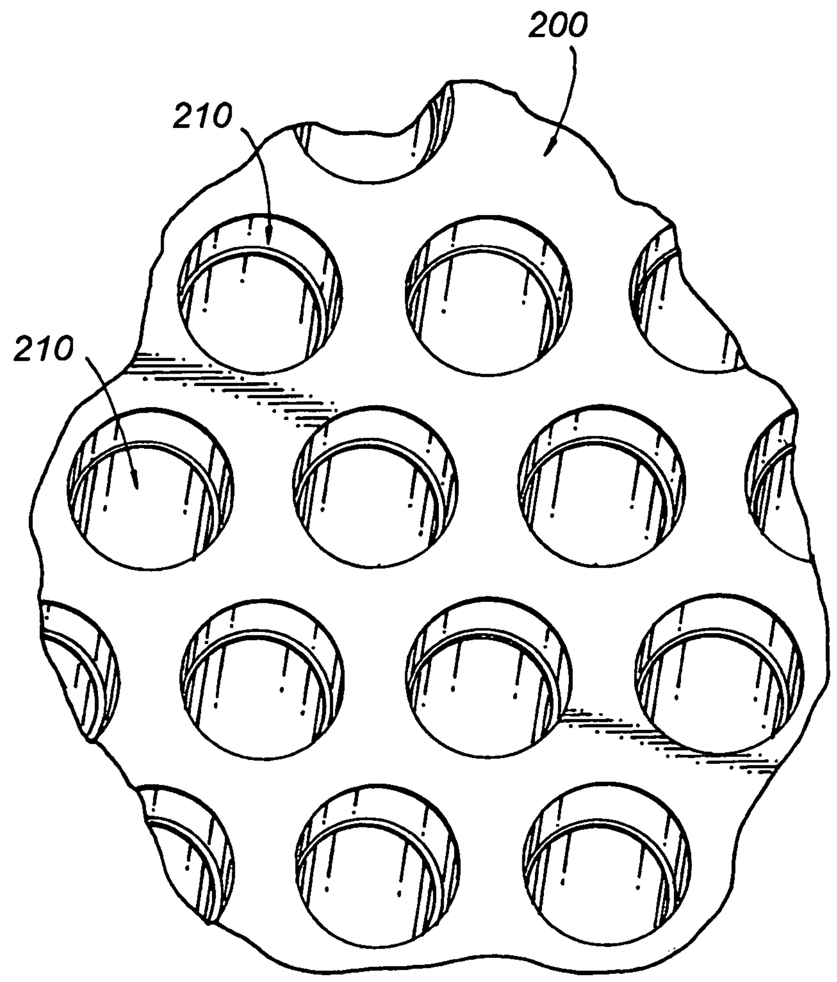
FIG. 3 is a magnified top view of an embodiment of an orifice or grinder plate of the present invention.

FIG. 3 shows a magnified view of the orifice plate 200 showing the apertures 210.

Figure 4:
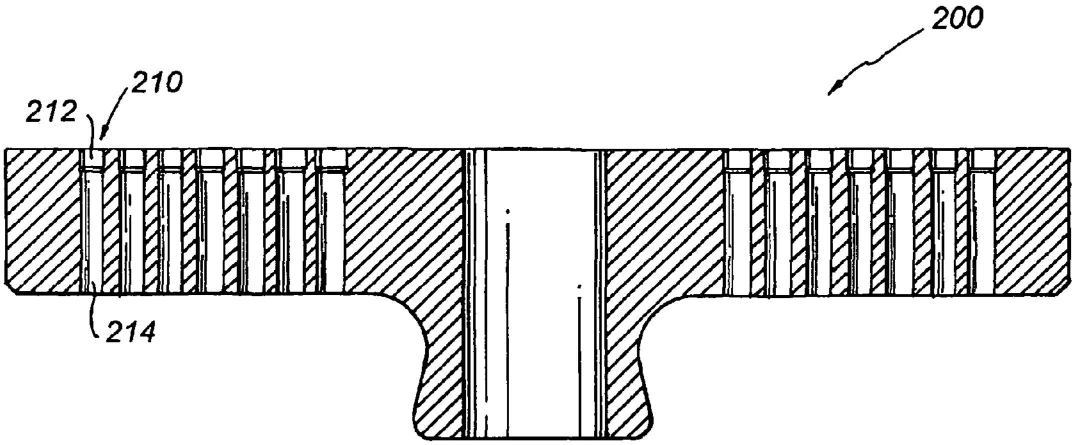
FIG. 4 is a cross sectional side view of an embodiment of an orifice or grinder plate of the present invention.

FIG. 4 shows the orifice plate 200 having the apertures 210. The apertures comprising a sphere section 212 and a cylinder section 214.

Figure 5:
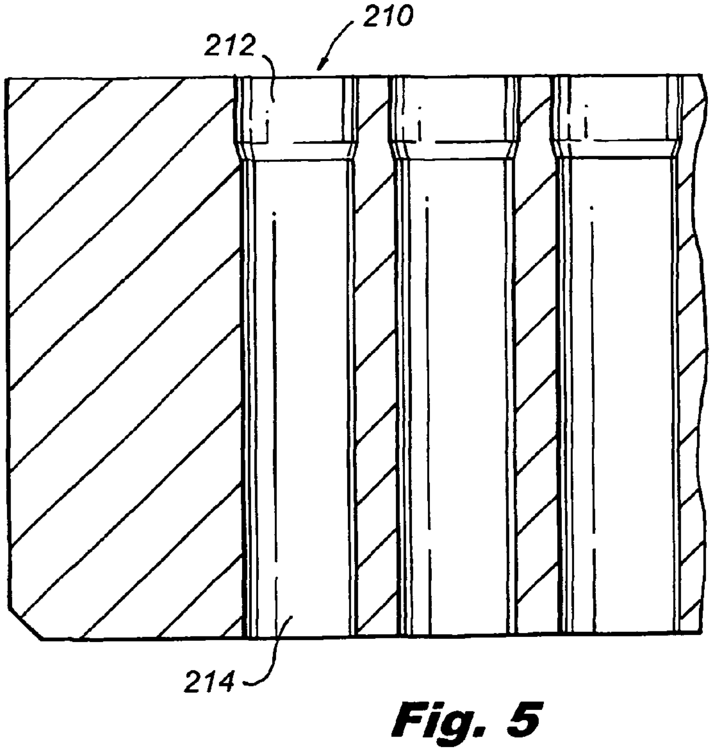
FIG. 5 is a magnified cross sectional side view of an embodiment of an orifice or grinder plate of the present invention.

FIG. 5 shows a magnified view of the apertures 210 having a spherical section 212 and a cylinder section 214.

Figure 6:
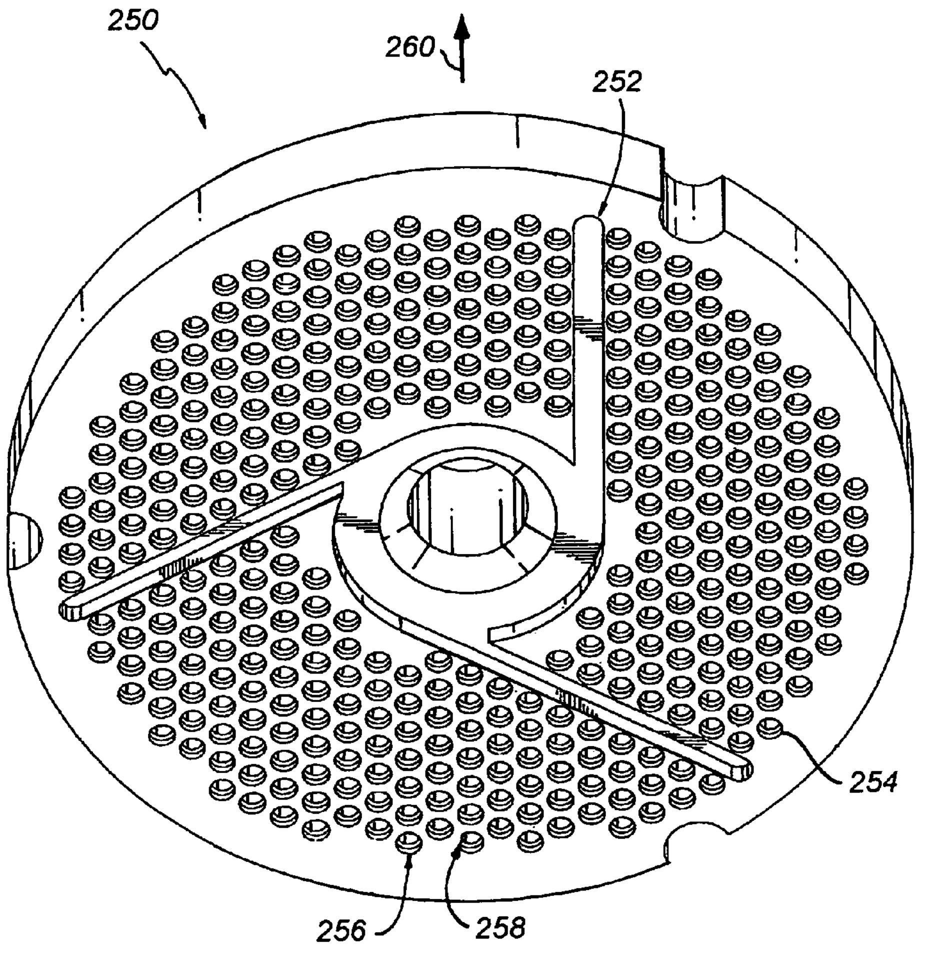
FIG. 6 is a top view of a grinder plate of the present invention.

FIG. 6 shows a grinder plate 250 having a bone collection slots 252, and orifices 254 which are comprised of a spherical diameter 256 and a cylindrical diameter 258. The arrow 260 shows the direction of the meat flow.

Figure 7:
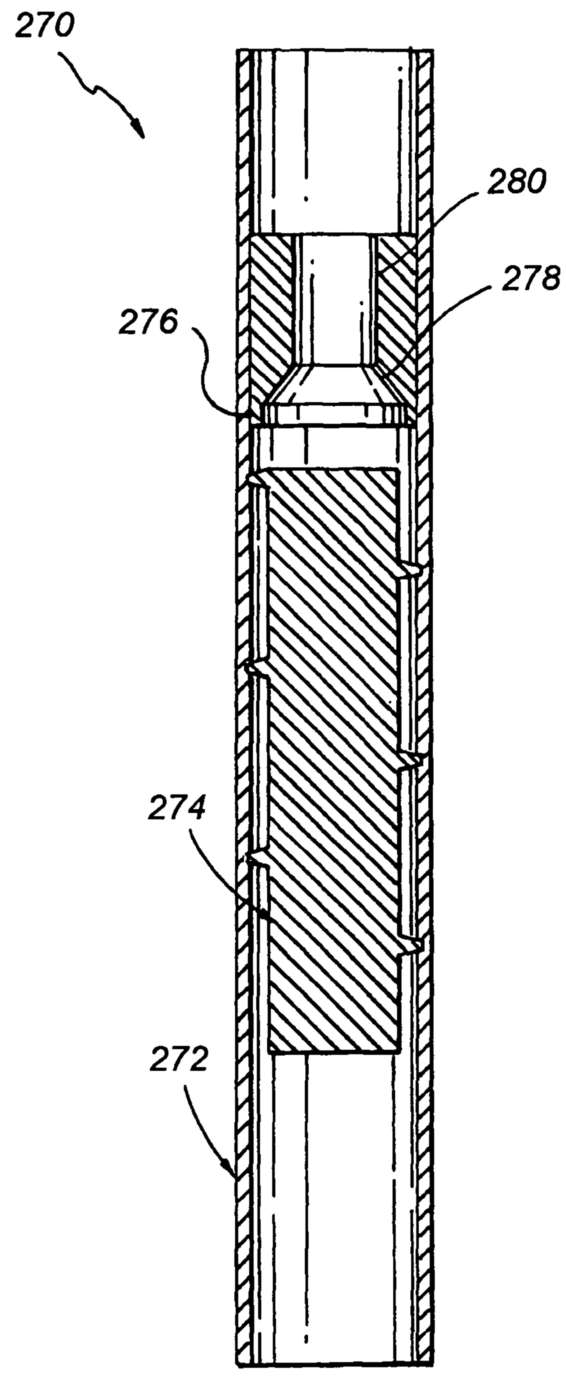
FIG. 7 is a side view of a bone collection tube assembly of the present invention.

FIG. 7 shows a bone collector tube 270 which is comprised of a waste tube 272, waste auger 274, FOT bone extraction insert 276 which is comprised of a spherical section 278 and a cylindrical section 280.

The present invention relates to fiber orientation technology. The fiber orientation technology drops pressure across the grinder plate, aligns the fibers of meat so that the contraction of the muscle fiber that does take place is in a direction of choice controlling both bite and shrinkage. The fiber orientation technology provides a lower resistance to product flow.

The fiber orientation technology provides a better shear surface for a cleaner cut. The fiber orientation technology aligns the fibers in the grinder plate so the shearing action disrupts as few muscle cells as possible. The fiber orientation technology decreases the total area of grinder plate blocking the meat flow resulting in less direction change to the product which works the meat. The fiber orientation technology pulls the meat fiber through the apertures of the grinder plate instead of pushing using the principles of the venturi/choke plate.

All of these characteristics of fiber orientation technology reduce the release and mixing of myosin with actin, the net effect is a controlled orientation of the fiber, less myosin activity resulting in a better bite/bind and control over the final cook shape.

Spherical geometry in apertures of the grinder plate creates venturi effects.

The grinder plate has a multiplicity of fill orifices distributed in a predetermined pattern. The orifices consist of spherical intersections or a curved structure intersecting a cylindrical section. The spherical section or curved structure has a diameter no greater than the choke flow for the liquid gas or solid used and is no less than the diameter of the connected cylindrical portion. By a reduction in the cross-sectional area a "venturi" condition is created. By using spherical sections or a curved structure, intersections between cylinder and spheres or curved structures create transitions which can be manufactured whose geometry approaches a venturi style system. It is preferred to have a sharper edge from the edge to the hole. To get a perfect edge it is preferred to sharpen with a grinder. In a preferred embodiment, the grinder plate is chrome coated.

Using conservation of mass and conservation of energy principles the volume rate of flow must be equal at all points in the systems. $(\rho_1 A_1 V_1)=(\rho_2 A_2 V_2)$. Since $\rho$ is a constant, velocity is inversely proportional to cross sectional area. Also, a venturi requires a ramp of some finite distance and a throat which also has a finite distance.

A spherical geometry feeding into a circular cross section which creates a product velocity increased while maintaining more consistent pressure on the meat. A sphere has the following properties:

All points on a sphere are the same distance from a fixed point.

Contours and plane sections of spheres are circles.

Spheres have the same width and girth.

Spheres have maximum volume with minimum surface area.

These properties allow meat to flow with minimum interruptions. There are no static or dead zones.

No matter what angle the cylinder intersects the sphere; the cross section is always a perfect circle.

Pressure inside of a sphere is uniform in all directions.

When meat is passed through a circular cross section of a sphere, the fact that pressure is uniform in a sphere creates forces which will be coaxial with the sphere. The reduction in area accelerates the meat through the cylindrical section of the fill plate. The acceleration has been shown empirically to align fibers in the primary direct of flow. Hence, there is fiber orientation.

The invention claimed is:

1. A grinding machine comprising: a hopper into which material to be ground is placed; a grinder portion comprising a grinding head, a mounting ring, a bridge, barrel, and a collection tube; a feed screw or auger is located in said grinding head to advance material in the hopper through said head; a knife assembly mounted at end of said feed screw; said knife assembly rotating with said feed screw and an orifice plate; a collection cone located downstream of said orifice plate; said orifice plate comprised of a plurality of grinding apertures and at least one collection passage; said grinding apertures comprising a sphere intersecting a cylinder configured to create a venturi effect which results in an acceleration of said material with a corresponding pressure drop through said grinding apertures.

2. The grinding machine of claim 1 wherein said grinding apertures aligns fibers material which has ground.

3. The grinding machine of claim 1 wherein said material to be ground is drawn through said grinding apertures of said orifice plate which stretches said material.

4. The grinding machine of claim 1 wherein said venturi effect created by said apertures aligns fiber of said material to be ground through said orifice plate.

5. The grinding machine of claim 1 wherein said material to be ground is stretched or aligned and creates a clean cut of said material.

6. The grinding machine of claim 1 wherein said ground material has little or no release of actin and myosin.

7. The grinding machine of claim 1 wherein said grinding apertures create the lowest cross section through the ground material.

8. The grinding machine of claim 1 wherein said food to be ground comprises meat.

* * * * *